(12) United States Patent
Chintada et al.

(10) Patent No.: US 8,407,548 B2
(45) Date of Patent: *Mar. 26, 2013

(54) DATA LINK LAYER TUNNELING TECHNIQUE FOR HIGH-SPEED DATA IN A NOISY WIRELESS ENVIRONMENT

(75) Inventors: Lakshmana Rao Chintada, Redmond, WA (US); Liang A. Hong, Redmond, WA (US); Kamyar Moinzadeh, Renton, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/546,533

(22) Filed: Jul. 11, 2012

(65) Prior Publication Data

US 2012/0275308 A1 Nov. 1, 2012

Related U.S. Application Data

(60) Continuation of application No. 12/131,636, filed on Jun. 2, 2008, now Pat. No. 8,234,533, which is a division of application No. 10/767,246, filed on Jan. 28, 2004, now Pat. No. 7,395,481, which is a continuation of application No. 09/694,943, filed on Oct. 24, 2000, now Pat. No. 6,697,983.

(51) Int. Cl.
*H04L 1/18* (2006.01)

(52) U.S. Cl. .......................... 714/749; 714/751; 370/236

(58) Field of Classification Search .................. 714/749, 714/751; 370/236

See application file for complete search history.

(56) References Cited

U.S. PATENT DOCUMENTS

| | | | |
|---|---|---|---|
| 4,726,027 A | 2/1988 | Nakamura et al. | |
| 4,841,526 A | 6/1989 | Wilson et al. | |
| 4,939,731 A | 7/1990 | Reed et al. | |
| 5,442,637 A | 8/1995 | Nguyen | |
| 5,539,923 A | 7/1996 | Matsumoto | |
| 5,546,411 A | 8/1996 | Leitch et al. | |
| 5,754,754 A | 5/1998 | Dudley et al. | |
| 5,812,524 A | 9/1998 | Moran et al. | |
| 5,930,233 A | 7/1999 | Kanerva et al. | |
| 6,141,784 A | 10/2000 | Davis et al. | |
| 6,400,695 B1 | 6/2002 | Chuah et al. | |
| 6,697,983 B1 | 2/2004 | Chintada et al. | |
| 6,782,047 B1 * | 8/2004 | Le et al. | 375/240 |
| 6,907,005 B1 * | 6/2005 | Dahlman et al. | 370/236 |
| 6,928,468 B2 | 8/2005 | Leermakers | |
| 7,395,481 B2 | 7/2008 | Chintada et al. | |
| 8,234,533 B2 | 7/2012 | Chintada et al. | |

FOREIGN PATENT DOCUMENTS

| | | |
|---|---|---|
| JP | 60247942 | 5/1987 |
| WO | WO 98/42108 | 9/1998 |

* cited by examiner

*Primary Examiner* — M. Mujtaba K Chaudry
(74) *Attorney, Agent, or Firm* — Woodcock Washburn LLP

(57) ABSTRACT

A data link layer tunneling technique improves the throughput of high speed data in noisy wireless environments. Recovering lost frames transmitted between a packet sending unit and a packet receiving unit in a data communications system generally comprises (a) identifying a failure to successfully receive a missed frame at the packet receiving unit; (b) establishing a logical tunnel channel at the packet receiving unit to acknowledge the next successfully received frame; (c) starting a first timer at the packet receiving unit; (c) upon receiving a tunnel establishment request from the packet receiving unit, the packet sending unit resending the missed frame on the logical tunnel channel and starting a second timer; and (d) the packet sending unit resending the missed frame a specified number of times until receiving an acknowledgement from the packet receiving unit.

20 Claims, 6 Drawing Sheets

DATA LINK LAYER TUNNELING TECHNIQUE FOR HIGH-SPEED DATA IN A NOISY WIRELESS ENVIRONMENT

CROSS REFERENCE TO RELATED APPLICATIONS

This application is a continuation of, and claims priority to, U.S. patent application Ser. No. 12/131,636, filed Jun. 2, 2008, now U.S. Pat. No. 8,234,533, which is a divisional of U.S. patent application Ser. No. 10/767,246, filed Jan. 28, 2004, now U.S. Pat. No. 7,395,481 issued on Jul. 1, 2008. U.S. patent application Ser. N. 10/767,246 is a continuation of U.S. patent application Ser. No. 09/694,943, filed on Oct. 24, 2000, now U.S. Pat. No. 6,697,983 issued on Feb. 24, 2004. Each of U.S. patent application Ser. No. 12/131,636, U.S. patent application Ser. No. 10/767,246, U.S. patent application Ser. No. 09/694,943, U.S. Pat. No. 7,395,481, and U.S. Pat. No. 6,697,983 is herein incorporated by reference in its respective entity.

FIELD OF THE INVENTION

The present invention relates generally to wireless communications, and more particularly, to a data link layer tunneling technique for resending missed frames between a packet sending unit and a packet receiving unit over a logical tunnel channel to improve the throughput of high speed data in a noisy wireless environment.

DESCRIPTION OF THE PRIOR ART

Fixed wireless systems are used to communicate voice and high speed data (HSD) between a base station (BS) and multiple remote units (RU) over an air-interface. HSD is generally used for web browsing, down loads and file transfer protocols (FTP). All data must be transferred notwithstanding the predictable errors caused by the communications links employed in the system (e.g., a 10E-03 Bit Error Rate (BER)). Accordingly, communication protocols have been developed for transmitting data in discrete blocks commonly referred to as "frames." These frames are evaluated at the receiving end to determine if the data is correctly received. If certain frames are in error or missed, those frames are retransmitted by the sending station.

Communications protocols are commonly based on the layered network architecture such as OSI. This is a 7-layer architecture including a physical layer (connectors, media, electrical signaling) and a data link layer, which packages the data into frames, manages data transmission over a link (error handling and the like), and facilitates access control (when each station may transmit). One way of achieving full-duplex data transmission over a single communication channel utilizes what is known in the art as a "sliding window protocol." At any instant in time, the sender maintains a list of consecutive sequence numbers corresponding to frames it is permitted to send. These frames fall within a "sending window." In the same manner, the receiver maintains a "receiving window" corresponding to the frames it is permitted to accept. The sending and receiving windows do not necessarily have the same upper and lower limits, or the same size. The sequence numbers within the sender's window represent frames sent but not yet acknowledged. Whenever a new data packet arrives from the network layer, it is given the next highest sequence number, and the upper edge of the window is advanced by one. When an acknowledgement is received, the lower edge of the window is advanced by one. The window continuously maintains a list of unacknowledged frames. Since frames currently within the sender's window may be lost or changed during transmission, the sender must keep all the sent frames in memory in the event a retransmission is required. Accordingly, if the maximum window size is "K", the sender needs K buffers to hold the unacknowledged frames in memory. If the window ever exceeds its maximum size, the sending data link layer must shut off the network layer until a buffer is freed up. The receiving data link layer's window corresponds to the frames it can accept. Any frame that falls outside the window is discarded. When a frame with a sequence number equal to the lower edge of the window is received, that frame is passed to the network layer, an acknowledgment is generated to the sender, and the window is rotated by one. Unlike the sender's window, the receiver's window always remains at its initial size.

An example of a sliding window protocol in a data communications system is disclosed in U.S. Pat. No. 4,841,526. In the '526 patent, the window size of the sending or receiving station is selected in accordance with the speed, length or error rate of the communication link or frame size used to maximize the communication link. The negative acknowledgements sent by the receiving station specify the upper and lower limit of a range of identification numbers of frames unsuccessfully received to increase transmission efficiency. Before data is transmitted, the sending and receiving stations exchange preferred sets of link parameters and generate a modified set of link parameters to resolve potential conflicts. One of the sending and receiving stations stores a table defining the frame sizes for use with different bit error rates of the communication link. The station evaluates the current bit error rate to select the optimum frame size from the table and adjust the frame size.

To provide HSD over a wireless system, a large window size (K) is required. As an example, at a transmission rate of 512 kbps, a window size K of 45 is used. In such a system, loss of a frame will cause relatively long silent periods or what is referred to as "channel idle." Application layers such as FTP or web browsing pump data at a higher rate than the air link data thereby causing the data link layer window to be filled at a very fast rate. If the receiving station loses a frame, it sends a selective reject message (SREJ) to the sending station. By the time the sending station receives the SREJ, however, the window can be filled, and neither the sender nor receiver will be able to transmit or receive until the outstanding frame clears. This causes a silent or "channel idle" period where the sending station cannot transmit and the receiving station cannot receive more than the last acknowledged frame (Va)+window size (K).

In view of the above, there exists a need for a new method of enhancing HSD transmission in wireless environments that reduce the idle periods caused by lost frames.

SUMMARY OF THE INVENTION

In view of the above, it is an object of the present invention to provide a data link layer tunneling technique for improving the throughput of high speed data in a noisy wireless environment.

It is another object of the invention to prevent large idle gaps over a wireless communications channel caused by missed frames.

It is still another object of the present invention for the data link layer to establish a tunnel to clear outstanding frames and enable data packets to be exchanged even when the window is full.

In accordance with the above objects and additional objects that will become apparent hereinafter, the present invention provides a method of recovering lost frames transmitted between a packet sending unit and a packet receiving unit in a data communications system. The method generally comprises the steps of: (a) identifying a failure to successfully receive a missed frame at the packet receiving unit; (b) establishing a logical tunnel channel at the packet receiving unit to acknowledge the next successfully received frame; (c) starting a first timer at the packet receiving unit; (c) upon receiving a tunnel establishment request (TER) from the packet receiving unit, the packet sending unit resending the missed frame on the logical tunnel channel and starting a second timer; and (d) the packet sending unit resending the missed frame a specified number of times until receiving an acknowledgement from the packet receiving unit.

In accordance with the method, the packet sending unit sends an I-frame to the packet receiving unit. Upon successful receipt of an I-frame and identification of a missing frame, the packet receiving unit generates a supervisory frame (TER) with a sequence number N(R) set to the missing frame and payload set to the number of consecutive frames. The packet receiving unit establishes a logical tunnel channel, sends the TER (frame, payload) to the packet sending unit, and starts a first timer. When the TER (frame, payload) is received, the packet sending unit starts a second timer and resends the missed frame over the logical tunnel channel. If the retransmitted missed frame is not received by the packet receiving unit before the first timer expires, the packet receiving unit retransmits the TER a predetermined number of times. If the retransmitted frame is not received by the packet receiving unit after being retransmitted a predetermined number of times and frame overflow does not occur, the frame is recovered using a normal recovery procedure. If the first timer has not expired, the packet receiving unit continues to acknowledge all frames with a predetermined poll bit setting irrespective of when the sender's window closes. If the missed frame is acknowledged, the packet receiving unit sends a receive ready (RR) message to the packet sending unit. If the acknowledgement for retransmitted I-frame does not come before the second timer expires, the packet sending unit will send the same frame a predetermined number of times. If the packet sending unit receives the RR message, it closes the layer tunneling channel (LTC). If the packet sending unit has resent the missing frame the predetermined number of times and no confirmation has been received from the packet receiving unit, a normal recovery is made.

The present invention will now be described with particular reference to the accompanying drawings.

DETAILED DESCRIPTION OF THE PREFERRED EMBODIMENTS

Figure 1:
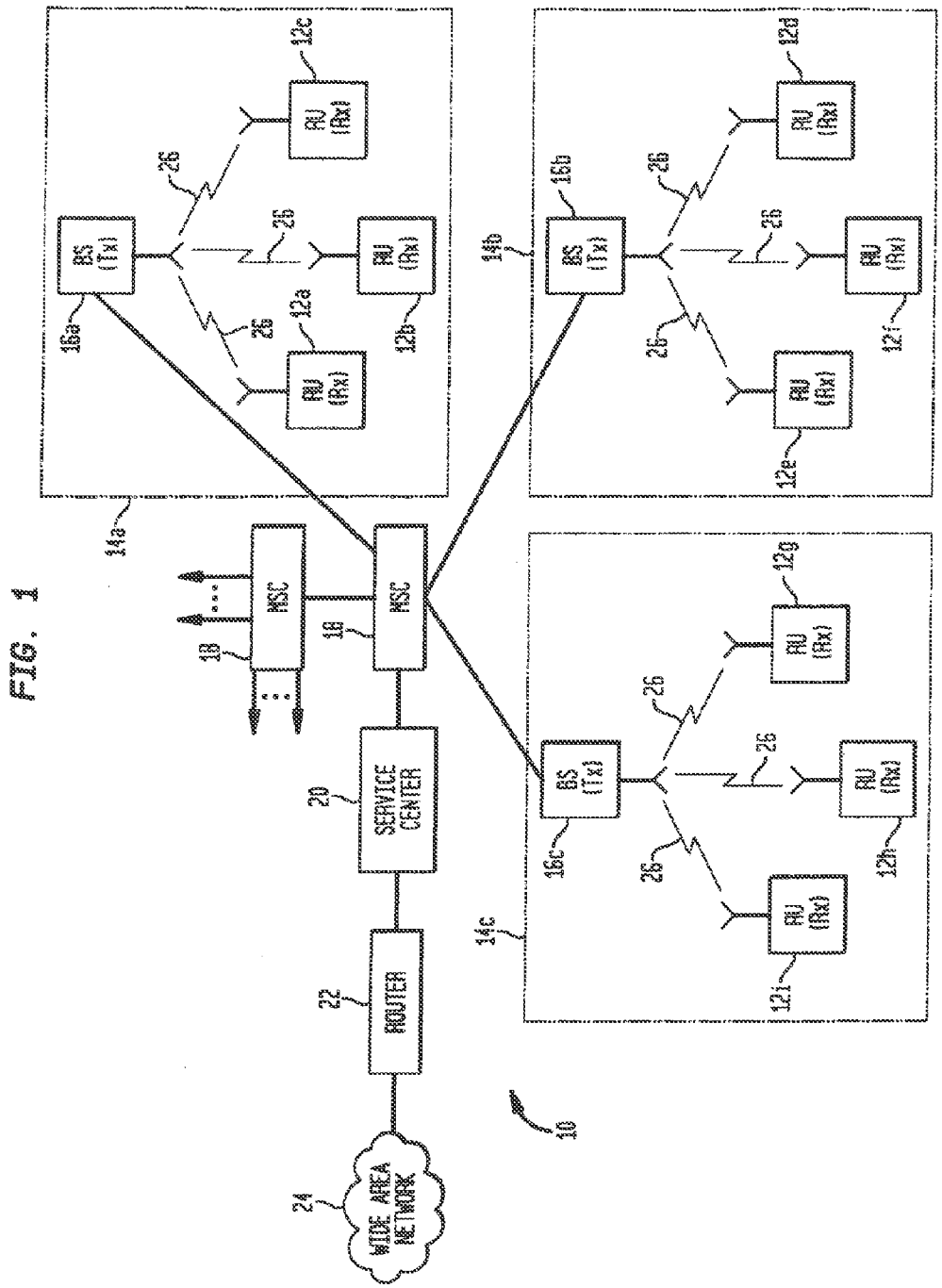
FIG. 1 is a conceptual schematic of a representative wireless communications system.

With reference now to the drawings, FIG. 1 depicts a conceptual diagram of a wireless communications network (WCS) generally characterized by the reference numeral 10. The WCS 10 serves a number of wireless remote units ("RU"). 12.sub.A-I within a geographic area partitioned into a plurality of spatially distinct regions called "cells" 14.sub.A-C. Each cell 14 includes a respective base station ("BS") 16.sub.A-C, and a boundary represented by an irregular shape that depends on terrain, electromagnetic sources and many other variables. The remote units communicate via one or more wireless access technologies (e.g., TDMA, CDMA, FDMA, etc.), providing one or more services (e.g., cordless, cellular, PCS, wireless local loop, SMR/ESMR, two-way paging, etc.) with signals representing audio, video, high speed data (HSD), multimedia, etc. Each BS 22 communicates with a Mobile Switching Center (MSC) 18, also known as a mobile telephone switching office, in accordance with well-known standards. The MSC 18 is interconnected with a customer service center 20 and a router 22 to a wide area network (WAN) 24. The MSC is also connected to local switching offices (not shown) that access wireline terminals, and a toll switching office (not shown). The MSC 18 has several functions, including routing or "switching" calls between wireless communications terminals or base stations or, alternatively, between a wireless communications terminal and a wireline terminal accessible to a MSC 18 through LSOs and/or TSOs. The operation of the WCS is well known and need not be described in detail with respect to the present invention. For the purpose of illustration, a base station (BS) 22 corresponds to a "packet sending unit" Tx and a remote unit (RU) 18 corresponds to a "packet receiving unit" Rx. In normal operation data is transferred from Tx to Rx, and Rx sends acknowledgement information back to Tx. The acknowledgment information is communicated in the form of data groups including control information and acknowledgement information, or the acknowledgments are "piggy-backed" onto data frames communicated in the opposite direction from Rx to Tx using known protocols. Although the drawings depict an illustrative mobile wireless system, the protocols herein have equal applicability to fixed wireless systems (FWS) which are used to connect a fixed subscriber to a digital switching center and a data service node via a neighborhood antenna.

In the illustrative embodiment, HSD travels over an air data link 26 between Tx and Rx. The data link layer may be "asymmetrical," i.e., the downloading data rate from Tx to Rx can be greater than the uploading data rate from Rx to Tx, or Tx>Rx. As an example, the data downlinked from Tx to Rx is 512 Kilo bits per second (Kbps), and the data uplinked from Rx to Tx is 128 Kbps. In accordance with the sliding window protocol, at any instant in time Tx maintains a list of consecutive sequence numbers corresponding to frames it is permitted to send. These frames fall within a "sending window." In the same manner, Rx maintains a "receiving window" corresponding to the frames it is permitted to accept. The sending and receiving windows do not necessarily have the same upper and lower limits, or the same size. The sequence numbers within the sender's window represent frames sent but not yet acknowledged. Whenever a new data packet arrives from the network layer, it is given the next highest sequence number, and the upper edge of the window is advanced by one. When an acknowledgement is received, the lower edge of the window is advanced by one. The window continuously maintains a list of unacknowledged frames. Since frames currently within the sender's window may be lost or changed during transmission, the sender must keep all the sent frames in memory in the event a retransmission is required. Accordingly, if the maximum window size is "K", the sender needs K buffers to hold the unacknowledged frames in memory. If the window ever exceeds its maximum size, the sending data link layer must shut off the network layer until a buffer is freed up. The receiving data link layer's window corresponds to the frames it can accept. Any frame that falls outside the window is discarded. When a frame with a sequence number equal to the lower edge of the window is received, that frame is passed to the network layer, an acknowledgment is generated to the sender if the poll bit is set to "1" (P=1), and the window is rotated by one. Unlike the sender's window, the receiver's window always remains at its initial size. In the illustrative example the window size (K)=45, and the maximum sequence number Ns=127 ($2^7-1$). This means that Ns varies from 0 to 127 and subsequently rolls over. In high bandwidth systems, the sequence numbers can go up to 16,383 ($2^{14}-1$). As shown in the drawings, the poll bit setting equals the last acknowledged frame+K−1, or the last acknowledged frame+(K*3)/4. Alternatively, the poll bit may be specified at any other time for explanation purposes only.

The following terminology regarding the interchange of information between Tx and Rx applies throughout this application and is listed below for reference as it is well understood by those skilled in the art:

Send state variable V(S): a variable that identifies the sequence number of the next frame to be transmitted. The V(S) is incremented with each frame transmitted.

Receive state variable V(R): a variable that denotes the number expected to be in the sequence number of the next frame. The V(R) is incremented with the receipt of an in-sequence and error-free frame.

Send sequence Number(Ns): this number indicates to the receiver the sequence number of the next frame that will be transmitted by the sender.

Receiving Number N(R): an expected send sequence number (Ns) of then next to be received frame. It indicates up to N(R)-1 frames that were successfully received.

Acknowledge state variable V(A): the last frame that has been acknowledged by the sender's peer. The Va is updated upon receiving an error free I or Supervisory (S) frame in sequence having a receiving sequence number Nr value is one that is in the range of Va<=Nr<=Vs.

| Type | Description | value 512 Kbps |
|---|---|---|
| K | window size: window size of sliding window protocol. | 45 |
| T200 | Re-establishment/Retransmit timer: Tx expects an acknowledgement before the T200 timer expires. Tx retransmits the same packet N200 times before it gets an acknowledgment until T200 expires. | 5 Sec |
| T201 | TER Recovery Timer: Acknowledgements for retransmitted out of sequence frames should occur before T201 expires. If T201 expires Tx retransmits the out of sequence I frame N201 times before re-establishment. | 5 Sec |
| T202 | TER Retransmit Timer: The out-of-sequence frame should be received before T202 expires, otherwise Rx retransmits the SREJ frame N202 times before re-establishment. | 5 Sec |
| T203 | Idle Timer | 20 Sec |
| T205 | Piggy Back Timer | 2 Sec |
| N200 | T200 retry count | 5X |

-continued

| Type | Description | value 512 Kbps |
|---|---|---|
| N201 | T201 retry count | 5X |
| N202 | T202 retry count | 5X |

The data link layer uses an "Information Frame" or "I"-frame as discussed above, to represent a protocol data unit (PDU) transmitted between a packet sending unit and a packet receiving unit (i.e., Tx and Rx). An illustrative frame format is shown below:

| 8 | 7 | 6 | 5 | 4 | 3 | 2 | 1 | |
|---|---|---|---|---|---|---|---|---|
| Address Field (TEI) | | | | | | | | Address field size: 2 octets |
| Length Field | | | | | | | | Length field size: 2 octets |
| Control Field | | | | | | | | Control field size: 2 to 5 octets |
| Information Field | | | | | | | | Info. field size: Up to 251 bytes |

The basic numbering convention is based on bits grouped into octets as specified in the Q.921 recommendation that is well known in the art.

The address field is represented by the Terminal Endpoint Identifier (TEI) assigned to each RU, and two control bits. The address field extension (EA) bit is used to indicate the extension of TEI octets. When set to "0", it signifies that another octet of the TEI follows. A "1" indicates that it is the final octet. The command/response (C/R) bit identifies a frame as either a command or a response. The transmitter sends commands with C/R set to "1" and responses with C/R set to "0". The RU does the opposite with commands with the C/R set to "0" and responses with the C/R set to "1". The address field format is shown below:

| 8 | 7 | 6 | 5 | 4 | 3 | 2 | 1 |
|---|---|---|---|---|---|---|---|
| C/R | TEI (higher order) | | | | | | |
| TEI (lower order) | | | | | | | EA = 1 |

The frame length field indicates the total data link frame length in bytes and includes the data rate as follows:

| | 8 | 7 | 6 | 5 | 4 | 3 | 2 | 1 |
|---|---|---|---|---|---|---|---|---|
| octet 1 | data rate | | | RES | | higher order 3 bits | | |
| octet 2 | Lower order 8 bits | | | | | | | |

The data rate is used for Tx to identify and communicate with different receiving stations. The control field contains the commands, responses, and the sequence numbers to maintain data flow accountability of the link between the Tx and Rx. It also defines the frame functions and invokes logic to control traffic. The content and size of the control field vary according to the use of the frame. The field can be in one of three formats: information (I), supervisory (S), and unnumbered (U).

The information frame (I-frame) which is shown in the drawings, is used to transmit end-user data between Tx and Rx. The information frame may also acknowledge the receipt of data from a transmitting end point. It also can perform such functions as a poll command. Traffic at Tx and Rx is controlled by counters called state variables. These counters will be maneuvered based on the received I-frame control field values. The I-frame control field format is shown below:

|         | 8 | 7 | 6 | 5 | 4 | 3 | 2 | 1 |
|---------|---|---|---|---|---|---|---|---|
| octet 1 | (higher order) N(S) | | | | | | | 0 |
| octet 2 | N(S) (lower order) | | | | | | | P/F |
| octet 3 | N(R) higher order | | | | | | | |
| octet 4 | N(R) (lower order) | | | | | | | RES |
| octet 5 | M | EM | RES | | | | | SAPI |

The sequence number Ns is the identification number for the I-frame. Typically the I-frames are numbered in the same order as their transmission. Similar to Q.921, I-frames are always exchanged as command type frames during multiple frame operation on point-to-point connections. A Poll/Final (P/F) or "Poll Bit" is used to solicit a response from the peer entity. When the P bit set to 1 (P=1), the sender Tx will solicit a response frame from Rx. The More (M) bit is used to indicate that the current PDU is the last data unit in a complete application packet. The I-frame may support either an encrypted or unencrypted payload. This is not relevant to the present invention but is included for purposes of illustration with respect to frame formats as the Encryption Mode Enabled/Disabled (EM) bit. Finally, the Service Access Point Identifier (SAPI) includes 4 bits that indicate the target application type. The values are defined as: 0x0000—IP SAPI, 0x0001—OM SAPI, 0x0010—SA SAPI.

The supervisory frame (S-frame) is used to perform such control functions as acknowledgment of frames, request for retransmission of frames, and request for the temporary suspension of frame transmission. The supervisory frame format follows:

|         | 8 | 7 | 6 | 5 | 4 | 3 | 2 | 1 |
|---------|---|---|---|---|---|---|---|---|
| octet 1 | Reserved | | S-Type | | | | 0 | 1 |
| octet 2 | P/F | N(R) (higher order) | | | | | | |
| octet 3 | N(R) (lower order) | | | | | | | RES |

The supervisory frame supports 4 different command/response types: Receive/Ready (RR); Receive Not Ready (RNR); Tunnel Establishment Request (TER) and Selective Reject (SREJ). N(R) is the expected send sequence number of the next I-frame to be received. The Poll/Final bit (P/F), unlike an I-frame, can be used to signify either command or response mode. In the command frame, the P/F bit is referred to as the P bit; and in response frame, it is referred to as F bit. The reserved field value is set to 0.

The receive ready (RR) frame format is used to indicate that Rx is ready to receive an I-frame, acknowledge a previously received I-frame numbered up to and including N(R)-1, clear a busy condition that was indicated by the earlier transmission of an RNR frame, and solicit Tx's status by sending an RR command with the P bit set to 1. The RR frame will also close the TER. The RR frame format follows:

|         | 8 | 7 | 6 | 5 | 4 | 3 | 2 | 1 |
|---------|---|---|---|---|---|---|---|---|
| octet 1 | 0 | 0 | 0 | 0 | 0 | 0 | 0 | 1 |
| octet 2 | P/F | N(R) (higher order) | | | | | | |
| octet 3 | N(R) (lower order) | | | | | | | RES |

The receive not ready (RNR) frame is used to indicate a busy condition where it is unable to accept additional incoming I-frames temporarily. The value of N(R) acknowledges I-frames up to and including N(R)−1. The busy condition can be cleared by sending a RR or TER frame. The RNR also enables Tx to solicit the status of Rx by sending the RNR command with the P bit set to 1. The RNR frame format follows:

|         | 8 | 7 | 6 | 5 | 4 | 3 | 2 | 1 |
|---------|---|---|---|---|---|---|---|---|
| octet 1 | 0 | 0 | 0 | 0 | 0 | 1 | 0 | 1 |
| octet 2 | P/F | N(R) (higher order) | | | | | | |
| octet 3 | N(R) (lower order) | | | | | | | RES |

The TER frame is used to request retransmission of single frame or multiple frames (single+payload) identified in the N(R) field+payload field. When sent as a command frame, if the P bit of the SREJ or TER frame is set to 1, the I frames numbered up to N(R)-1 inclusive, are considered as acknowledged. However, if the P bit is 0, then the N(R) of the SREJ or TER frame does not indicate acknowledgment of I frames. In a response frame, no acknowledgment is allowed. The SREJ/TER condition is cleared upon receipt of an I-frame with an N(S) equal to the N(R) of SREJ/TER frame. Once an SREJ or TER frame has been received, the I-frame that may have been transmitted following the I-frame indicated by the SREJ/TER frame is not be retransmitted as a result of receiving the SREJ/TER frame. Additional I-frames awaiting initial transmission may be transmitted following the retransmission of the requested I-frame. The SREJ frame format is shown as:

|         | 8 | 7 | 6 | 5 | 4 | 3 | 2 | 1 |
|---------|---|---|---|---|---|---|---|---|
| octet 1 | 0 | 0 | 0 | 0 | 1 | 1 | 0 | 1 |
| octet 2 | P/F = 0 | N(R) (higher order) | | | | | | |
| octet 3 | N(R) (lower order) | | | | | | | RES |
| octet 4 | Payload | | | | | | | |

The TER frame is similar to the SREJ format, except the bits in Octet 1 have been changed to identify this as a TER in lieu of an SREJ frame as follows:

|         | 8 | 7 | 6 | 5 | 4 | 3 | 2 | 1 |
|---------|---|---|---|---|---|---|---|---|
| octet 1 | 0 | 0 | 0 | 0 | 1 | 0 | 0 | 1 |
| octet 2 | P/F = 0 | N(R) (higher order) | | | | | | |
| octet 3 | N(R) (lower order) | | | | | | | RES |
| octet 4 | Payload | | | | | | | |

Figure 2:
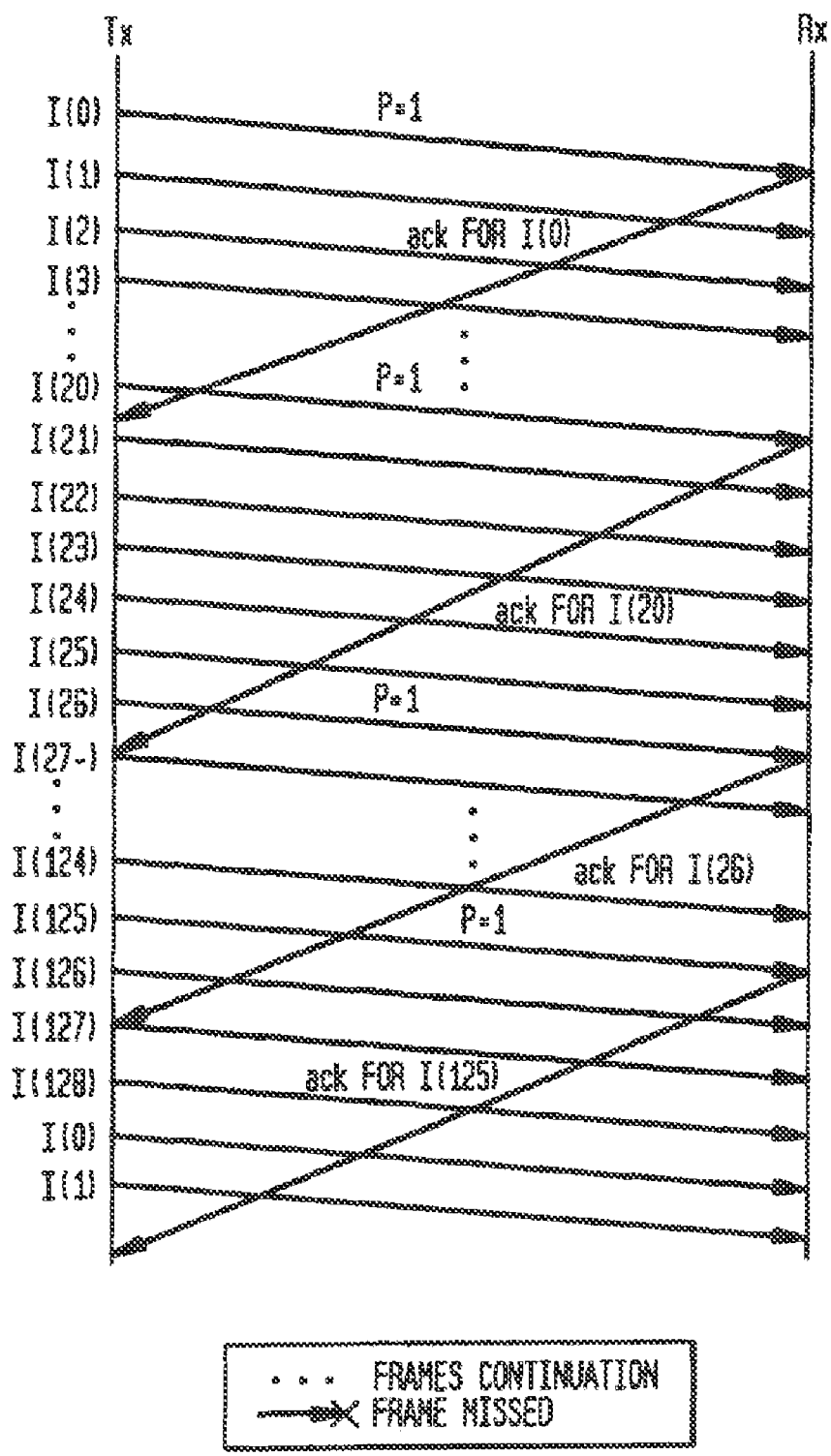
FIG. 2 is an operational flow diagram of the normal data transfer between the packet transmitting and receiving stations Tx and Rx, respectively.

FIG. 2 is an operational flow diagram of the normal data transfer between the packet transmitting and receiving stations Tx and Rx, respectively. Rx will acknowledge all frames (I) received with the poll bit set to 1 (P=1) in accordance with the above description. Here, frames I(0), I(20), and I(125) are designated with P=1. Respective acknowledgments (ACK) for I(0), I(20) and I(125) are communicated to Tx upon receipt of the respective P=1 frames. Alternatively, Rx can wait for the T205 "piggyback" timer to expire before it sends the acknowledgment. T205 is set upon receipt at Rx of an I-frame with P=0. When P=1, Rx will send immediate acknowledgments. In a piggyback operation, Rx sends the acknowledgment information for the received frames along with any data to be communicated to Tx using known protocols.

In accordance with the present invention, a Logical Tunnel Channel (LTC) is established between Tx and Rx when a frame gets lost during a normal transmission. The LTC is used to transport the missed frames between Tx and Rx. Because the transmission of such frames is made over a separate channel, Tx will assume that the missed frames have been transported successfully, and the sender's window (SW) will be "continuous" unless the initial missed frame is not transported successfully before SW reaches the initial missed frame−1.

Figure 3:
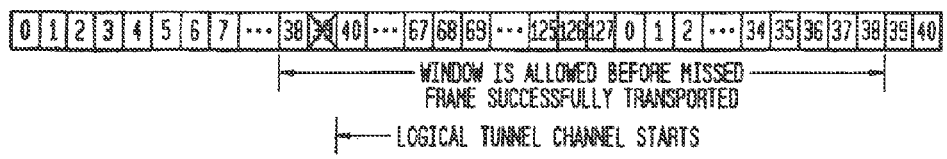
FIG. 3 is an operational flow diagram of a missing frame and tunneling operation.

Referring now to FIG. 3, frame I(39) was lost during transmission from Tx to Rx. The "missed" status of I(39) is detected at Rx upon receipt of I(40). Rx establishes the LTC to acknowledge I(40) and enable the retransmission of I(39) to Rx. The format of the TER message is described above. Rx will keep on sending acknowledgments for all frames received with poll bit set to 1. Upon receiving the TER (frame, payload) from the Rx, Tx resends I(39) over the LTC. Therefore, upon receiving the acknowledgment for I(40), Tx's window is still continuous because the missed frame I(39) is transported through the LTC. However, if the missed frame I(39) is not transported successfully by the time sender transmits the next I(38) (on the assumption set forth herein of a window size K=45 and 128 sequence numbers), the window will be stopped.

In this example, the sender Tx had a "time" window that extended to the maximum number of sequence numbers (in this case 128), instead of a window size K=45. With a maximum sequence number much greater than the window size, there is more time to transport the missed frames before the window stops. This has the advantage in that the maximum sequence number can be increased to as large a value as the frame permits. Rx can send an SREJ to Tx in lieu of an TER to provide for backwards compatibility.

Figure 4:
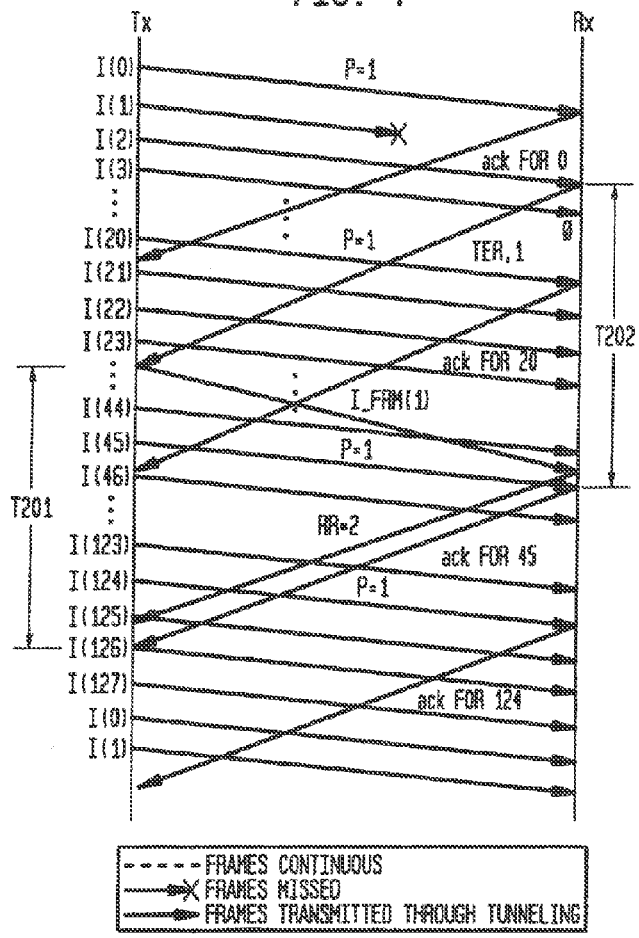
FIG. 4 is an operational flow diagram of a tunneling operation.
Figure 5A:
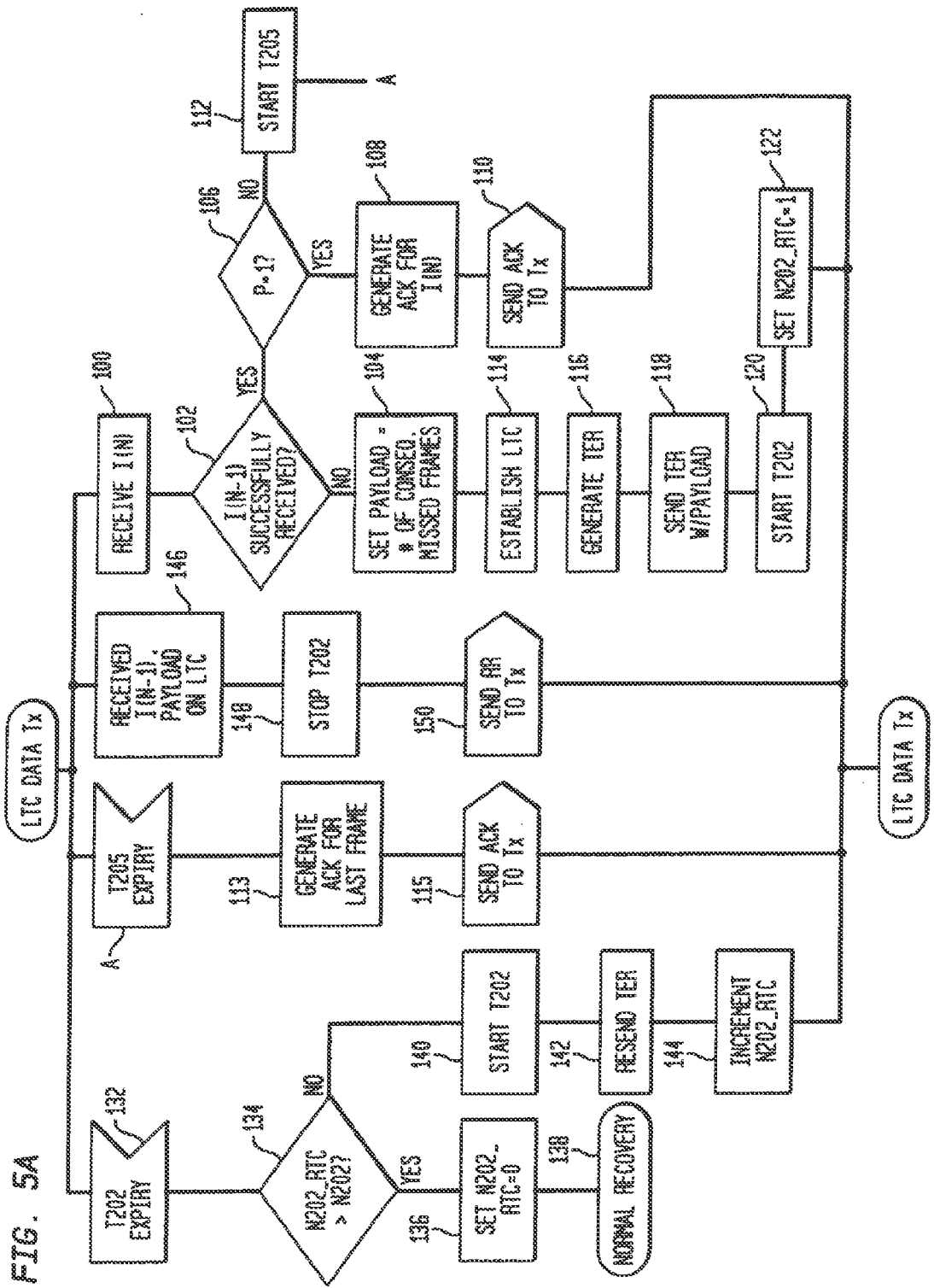
FIGS. 5A and 5B are flowcharts of the sequence depicted in FIG. 4 at Rx and Tx respectively.
Figure 5B:
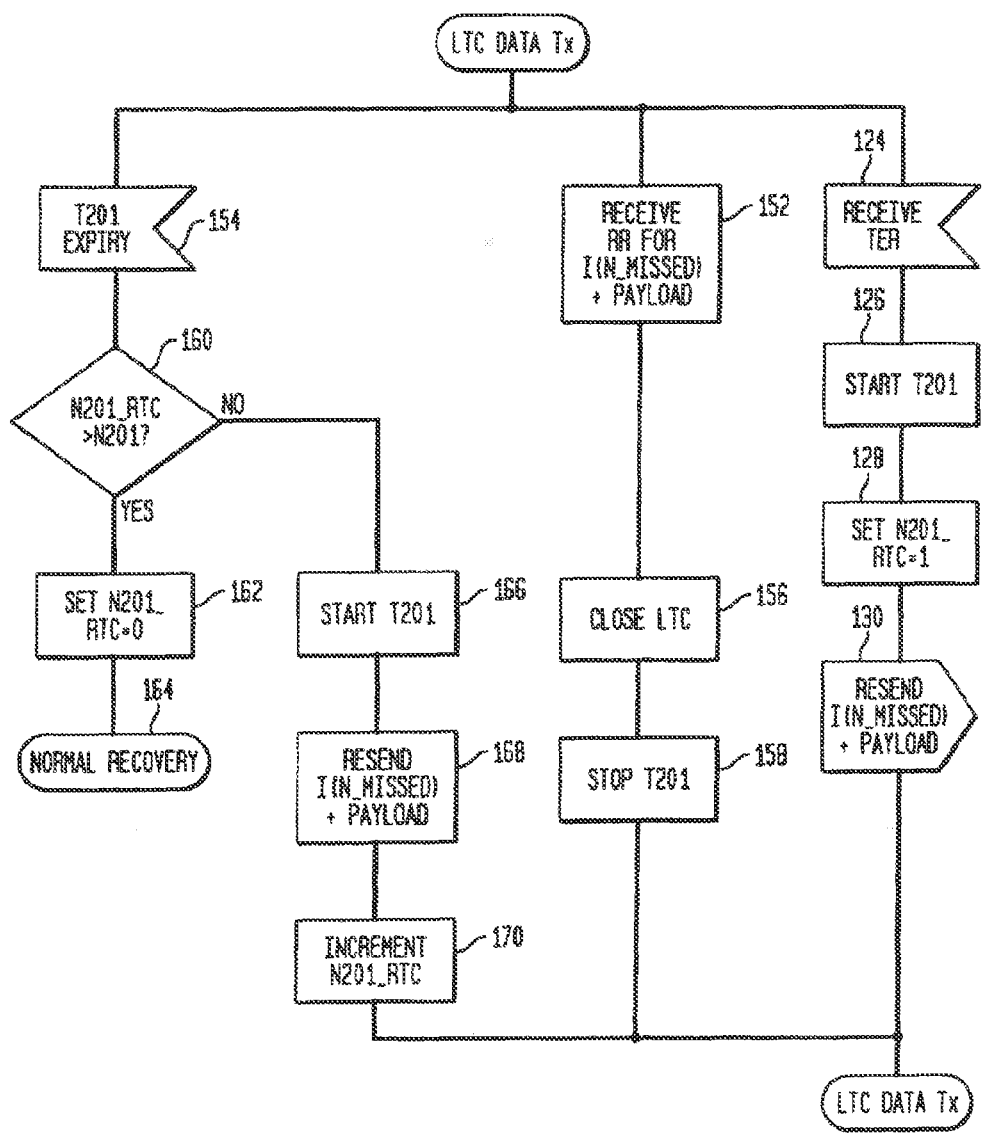

Referring now to FIGS. 4, 5A and 5B, there are depicted respective operational flow diagrams of an actual tunneling operation. FIG. 5A refers to the operational flow at Rx and FIG. 5B shows the operational flow at Tx. The diagrams illustrate loss of a single I-frame and the tunneling operation to recover the frame over the LTC. As can be seen in FIG. 4, I-frames (0-N) are communicated between Tx and Rx. At step 100 (FIG. 5A), I(N) is received by Rx. Rx checks whether I(N−1) was successfully received at step 102. Here in the example shown and described, I(1) has been lost as indicated by the "x" in FIG. 4. Upon receiving frame I(2), Rx sets payload=number of consecutively missed frames at step 104. The sequence number N(R) is set to 1 and payload set to NULL (indicating a single frame was missed). If (N−1) was successfully received, Rx checks whether I(N) has a poll bit setting of P=1 at step 106. If P=1, then an acknowledgment (ACK) is generated for I(N) at step 108, and communicated to Tx at step 110. If P=0, then Rx starts the piggyback timer T205 at step 112. Rx will then generate the ACK for the last frame received at step 113 upon expiration of T205 and send the ACK to Tx at step 115. If the frame was missed, Rx establishes the LTC at step 114 and generates a TER (I_missed, payload) at step 116. Rx then sends TER (I_missed, payload) to Tx at step 118 and simultaneously starts timer T202 at step 120. Rx then sets N202_RTC (retry count) to 1 at step 122. At step 124 (FIG. 5B), Tx receives TER (I_missed, payload), and starts timer T201 at step 126. Tx also sets the TER retry count N201_RTC to 1 at step 128. Tx will resend the missed frame(s) identified as I_missed+payload at step 130 over the LTC. This transmission occurs while Tx continues to send frames to Rx using regular procedures. If the retransmitted frame(s) is not received by Rx before T202 expires at block 132 (FIG. 5A), Rx checks whether N202_RTC>N202 at step 134. If N202_RTC exceeds the predetermined resend count, then N202_RTC is reset to 0 at step 136. A normal recovery of the missed frame(s) is made at step 138. If N202_RTC is not>than N202 at block 134, Rx starts T202 again at step 140, resends TER (I_missed, payload) at step 142, and increments T202_RTC at step 144. Rx will continue to retransmit the TER N202 times. Rx continues to acknowledge all frames with P=1 at 106, irrespective of when SW closes. When the missed frame(s) is received (step 146), Rx stops T202 at step 148 and sends a receive ready (RR) message to Tx at step 150 indicating the last frame acknowledged N(R)-1 and the next frame expected N(R). After the RR for the retransmitted frame(s) is received by Tx (step 152) the LTC is closed (step 156) and T201 stopped (step 158). If the RR has not been received and T201 expired (step 154), Tx checks at step 160 whether N201_RTC>N201. If the answer to this query is "yes", Tx sets N201_RTC=0 at step 162 and a normal recovery is made at step 164. If retry counts remain, Tx starts T201 again at step 166, resends the missed frame(s) at step 168 and increments N201_RTC at step 120. Tx will send the same frame N201 times.

Figure 6:
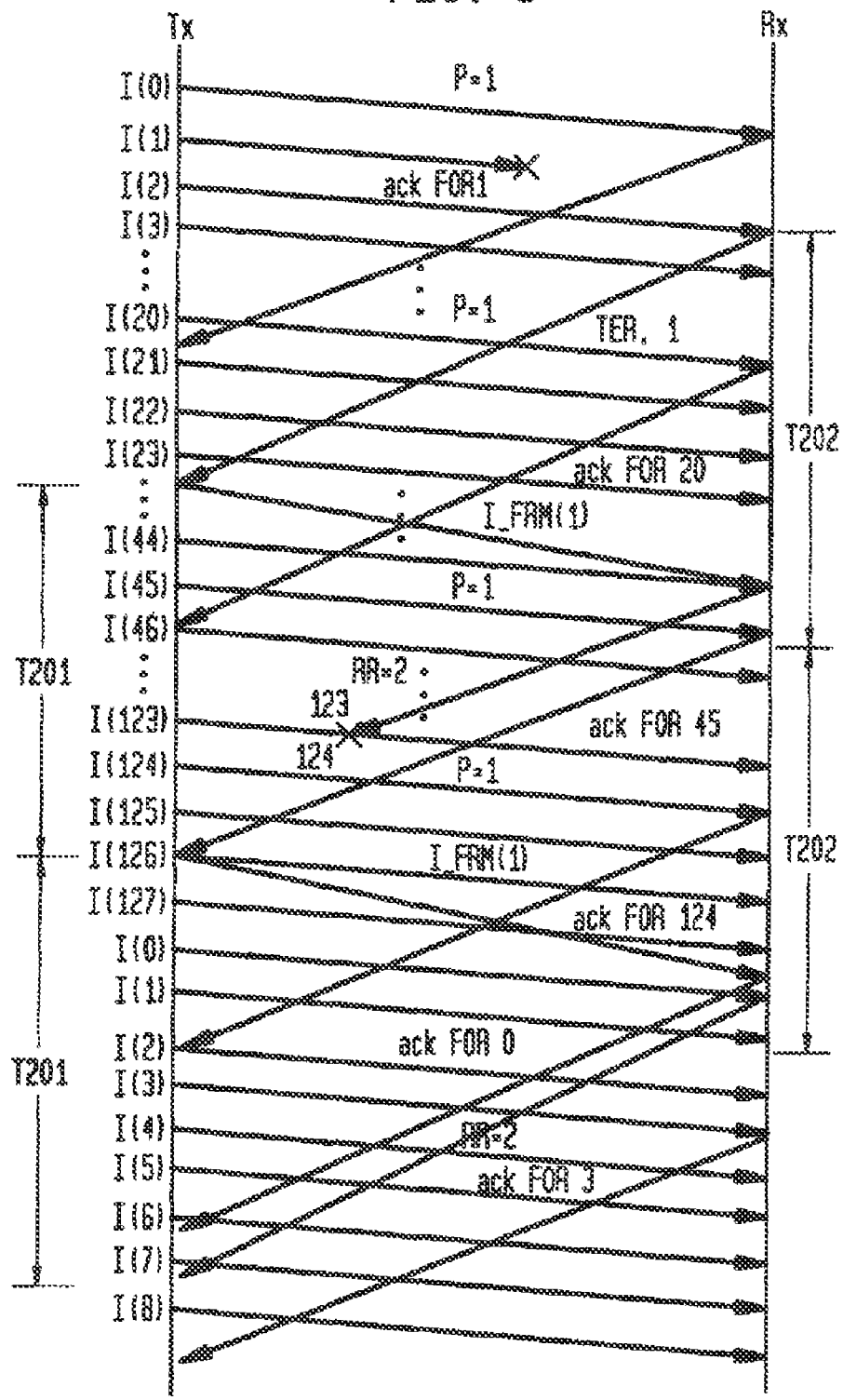
FIG. 6 is an operational flow diagram of an error recovery sequence.

Referring now to FIG. 6, there is depicted an operational flow diagram of an error recovery sequence using the tunneling operation of the present invention. As discussed above and illustrated in FIGS. 3 and 4, I(1) has been lost during transmission from Tx to Rx. Upon successful receipt of I(2), Rx generates a TER (frame, payload=0) indicating that frame I(1) was missed, and establishes the LTC to Tx. Rx starts timer T202 and communicates the TER (frame, payload) to Tx. When the TER (frame, payload) is received at the Tx, it will start timer T201, and send I-missed, payload to Rx. 1. If the retransmitted frames I_missed, payload is not received by Rx prior to expiration of T202, Rx will retransmit the TER to Tx N202 times. In this example, I_FRM(1) is received by Rx prior to the expiration of T202. Rx generates an acknowledgement RR, which is lost in transmission from Rx to Tx prior to the expiration of T201. Tx then resends I_FRM(1) and starts timer T201 again and the process repeats until Tx receives an RR frame corresponding to the retransmitted frame. If the RR frame is not received by the time the T201 timer expires, Tx retransmits to Rx N201 times. Upon receipt of the RR for the tunnel channel frame by Tx, the LTC is closed.

The present invention has been shown and described in what are considered to be the most preferred and practical embodiments. It is anticipated, however, that departures may be made therefrom and that obvious modifications will be implemented by those skilled in the art.

What is claimed is:

1. A method comprising:
   at a data receiving unit, receiving a first frame via a first channel;
   at the data receiving unit, determining a first sequence number of the first frame;
   at the data receiving unit, determining that a second frame associated with a second sequence number has not been received within a sliding window of a sliding window protocol, wherein the second sequence number is less than the first sequence number;
   at the data receiving unit, responsive to determining that the second frame has not been received, establishing a logical tunnel channel with a data sending unit;
   transmitting, from the data receiving unit to the data sending unit via the logical tunnel channel, a first request for retransmission of the second frame, the first request comprising an indication of a number of consecutively missed frames, wherein use of the logical tunnel channel allows a transmit window to advance without detecting an acknowledgement of receipt of the second frame;

at the data receiving unit, starting a first timer;

at the data receiving unit, detecting an expiration of the first timer before the second frame is received; and at the data receiving unit, responsive to detecting the expiration of the first timer before the second frame is received, transmitting, to the data sending unit via the logical tunnel channel, a second request for retransmission of the second frame, the second request comprising an indication of a number of consecutively missed frames.

2. The method of claim 1, further comprising receiving the second frame via the logical tunnel channel.

3. The method of claim 2, further comprising transmitting the acknowledgement of receipt of the second frame via the logical tunnel channel.

4. The method of claim 1, further comprising receiving the second frame via the first channel.

5. The method of claim 4, further comprising transmitting the acknowledgement of receipt of the second frame via the logical tunnel channel.

6. The method of claim 1, further comprising transmitting a predetermined number of requests for retransmission of the second frame via the logical tunnel channel.

7. The method of claim 1, further comprising recovering the second frame using an alternative method.

8. A method comprising:

at a data sending unit, transmitting a first frame and subsequently transmitting a second frame to a data receiving unit via a first channel;

at the data sending unit, responsive a request from the data receiving unit to establish a logical tunnel channel, establishing the logical tunnel channel with the data receiving unit;

advancing a transmit window at the data sending unit without receiving an acknowledgement of receipt of the first frame;

receiving, at the data sending unit from the data receiving unit via the logical tunnel channel, a first request for retransmission of the first frame, the first request comprising an indication of a number of consecutively missed frames;

responsive to receiving the first request, transmitting the first frame from the data sending unit to the data receiving unit via the logical tunnel channel;

at the data sending unit, starting a first timer;

at the data sending unit, detecting an expiration of the first timer before an acknowledgement of receipt of the first frame is received; and at the data sending unit, responsive to detecting the expiration of the first timer before the acknowledgement of receipt of the first frame is received, transmitting, to the data receiving unit via the logical tunnel channel, the first frame.

9. The method of claim 8, further comprising transmitting additional subsequent frames without receiving the acknowledgement of receipt of the first frame.

10. The method of claim 8, further comprising receiving the acknowledgement of receipt of the first frame via the logical tunnel channel.

11. The method of claim 8, further comprising transmitting the first frame via the logical tunnel channel a predetermined number times.

12. The method of claim 8, further comprising assigning a first sequence number to the first frame and a second sequence number to the second frame, wherein the second sequence number is subsequent to the first sequence number.

13. The method of claim 8, wherein the first frame and the second frame comprise user data.

14. The method of claim 8, wherein the first frame and the second frame comprise a request for receipt acknowledgement.

15. A device configured to:

transmit a first frame and subsequently transmit a second frame to a second device via a first channel;

responsive a request from the second device to establish a logical tunnel channel, establish the logical tunnel channel with the second device;

advancing a transmit window without receiving an acknowledgement of receipt of the first frame;

receive, from the second device via the logical tunnel channel, a first request for retransmission of the first frame, the first request comprising an indication of a number of consecutively missed frames;

responsive to receiving the first request, transmit the first frame to the second device via the logical tunnel channel;

start a first timer;

detect an expiration of the first timer before an acknowledgement of receipt of the first frame is received at the device; and responsive to detecting the expiration of the first timer before the acknowledgement of receipt of the first frame is received, transmit, to the second device via the logical tunnel channel, the first frame.

16. The device of claim 15, wherein the device is further configured to transmit additional subsequent frames without receiving the acknowledgement of receipt of the first frame.

17. The device of claim 15, wherein the device is further configured to receive the acknowledgement of receipt of the first frame via the logical tunnel channel.

18. The device of claim 15, wherein the device is further configured to transmit the first frame via the logical tunnel channel a predetermined number times.

19. The device of claim 15, wherein the device is further configured to assign a first sequence number to the first frame and a second sequence number to the second frame, wherein the second sequence number is subsequent to the first sequence number.

20. The device of claim 15, wherein the first frame and the second frame comprise a request for receipt acknowledgement.

* * * * *